May 24, 1966 W. I. SENGER 3,252,332
SEISMICALLY MOUNTED APPARATUS
Filed Sept. 4, 1962 2 Sheets-Sheet 1

INVENTOR.
WERNER I. SENGER
BY Andrus & Starke
ATTORNEYS

May 24, 1966  W. I. SENGER  3,252,332
SEISMICALLY MOUNTED APPARATUS
Filed Sept. 4, 1962  2 Sheets-Sheet 2
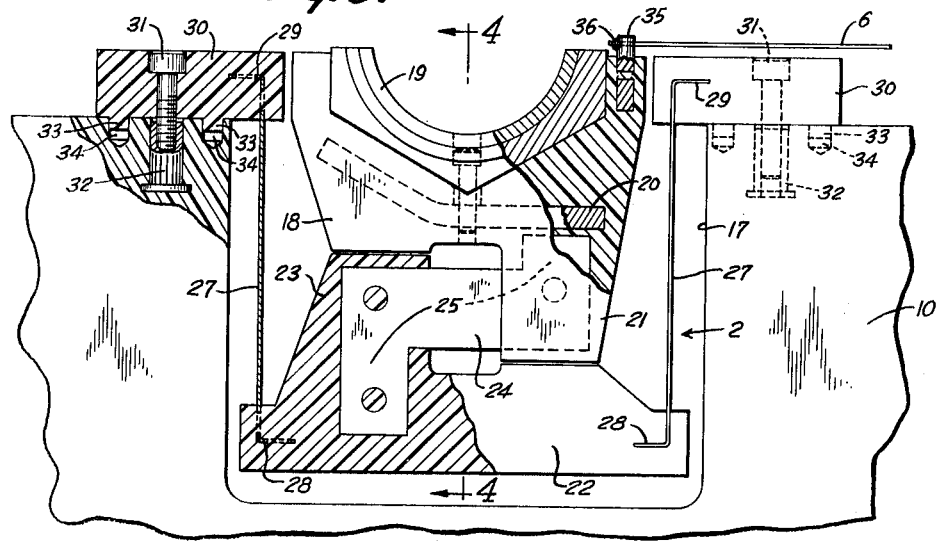
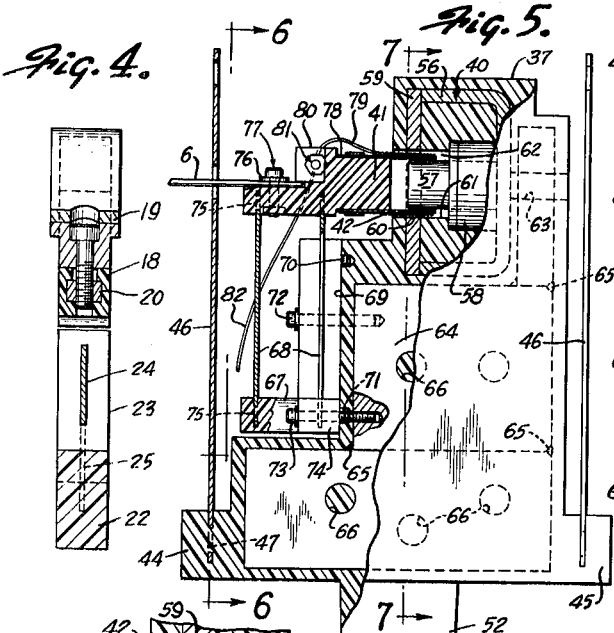
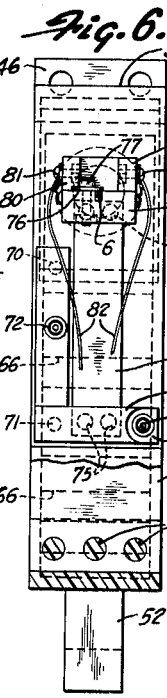
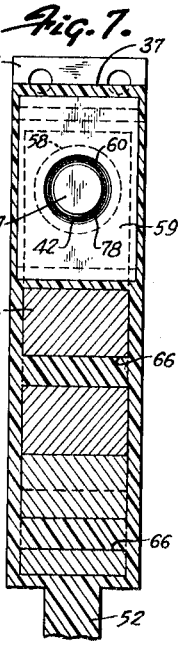
INVENTOR.
WERNER I. SENGER
BY Andrus & Starke
ATTORNEYS

United States Patent Office 3,252,332
Patented May 24, 1966

3,252,332
SEISMICALLY MOUNTED APPARATUS
Werner I. Senger, Madison, Wis., assignor to
Gisholt Corp., a corporation of Wisconsin
Filed Sept. 4, 1962, Ser. No. 221,280
14 Claims. (Cl. 73—471)

This invention relates to seismically mounted apparatus and particularly to a vibration signal generating assembly for balancing machines and the like including cast plastic work supports and unbalance pickup units having the seismic mounting springs integrally embedded and cast within plastic supporting and mounting elements.

Various rotating units are dynamically balanced during the process of manufacture to elimate undesirable or damaging vibration if the rotating equipment in its supporting bearings or the like. This balancing process involves determining and correcting the distribution of the mass in the unit such that it rotates about a given axis. Generally, the mass or weight alterations are made within the unit in a plurality of planes perpendicular to the rotational axis. To determine the amount and angle of unbalance, the rotating unit is mounted in a balancing machine having signal generating assemblies to establish an electrical signal related to the unbalance forces or influences in the rotating unit under test. For example, dynamoelectric machine rotors and the like are balanced in suitable seismically mounted work supports. The work support may conveniently be flexibly and seismically mounted within the balancing machine for movement in a horizontal plane in a manner to essentially eliminate or prevent rotor motion in the horizontal plane due to effects other than that of inaccurate mass distribution. The work support structure is coupled through a rod or wire-like member to a signal generating unit which is constructed to generate an electrical signal in accordance with the frequency and amount of the unbalance created motion. A highly developed and satisfactory generating unit employs a movable coil coupled to the work support and disposed within a magnetic field. The magnetic structure establishing the field and the coil must be seismically and flexibly mounted to restrict the relative movement of the coil within the field to that created by unbalance related motion of the work support in the horizontal plane.

Balancing machines have generally heretofore included work supports and generating units constructed of machined elements interconnecting the seismically mounting spring elements. Machined elements having relatively small tolerances are required to provide the accuracy of location of the springs. The machined components are usually formed of aluminum to maintain minimum weight or mass. This construction requires machining of a great number of parts to very close tolerances as well as the assembly of the various parts accurately and precisely in order to provide a reliable and accurate balancing machine. Substantial inventories of the various elements are required in order to allow for assembly of units on demand and for replacement of the parts. Because of the complexity of the assemblies, the repair and maintenance require skilled technicians and a substantial down time of the machine during repair and the like. The high cost of the complete assemblies is such that modular replacement is not practical.

In the signal generating units having a movable pickup coil, a tubular coil is preferably mounted in a small annular groove surrounding the leg of a magnetic frame. The air gap between the coil and the leg must of necessity be quite small to establish close coupling of the coil to the magnetic frame in order to obtain a suitable output signal. As a result, the coil has been generally mounted for rectilinear movement relative to the magnetic leg in order to establish the required close coupling without rubbing of the coil on the magnetic leg. This has resulted in relatively expensive and complicated mounting of the coil.

The present invention is particularly directed to seismic mounting means wherein the several assemblies can be constructed as a module of sufficient low cost to allow replacement of an assembly. The construction of the present invention provides great economy from the standpoint of machining and assembling to the end that the modular construction is practical from an economic standpoint.

In accordance with the present invention, the various seismic mounting elements other than the springs, pickup coil and the like are constructed of a suitable cast plastic, such as an epoxy resin, with the seismic mounting springs cast and embedded directly into the plastic resin supporting components. A metal filler in finely divided form is preferably mixed with the resin to increase the strength of the cast component. The resin is molded at temperatures which do not adversely affect the spring characteristics. This process is distinct and different than the die casting processes which employ heat and pressure to provide close tolerance. Applicant has found that molds for plastic casting of seismic mounting assemblies can be readily constructed to provides tolerances heretofore practically not obtainable with the conventional machined multi-part construction. The mold inventory cost is relatively low providing a minimal investment in apparatus for construction of the seismically mounted assemblies. Further, the plastic casting process is rapid and the components can be constructed in accordance with requirements as they arise thereby minimizing the previous large inventories.

The plastic parts essentially eliminate the problem of corrosion which is present in the prior art structures using machined metal elements.

Plastic can be employed which has a very great ability to hold its dimensions with varying temperatures and consequently establish similar operation under many varying circumstanes. This retention of dimensions is related to the shrinkage of the material with age as well as temperature and in selected plastics is practically nonexistent.

Tolerance dimensional control as well as the dimensional retention of the plastic is such that the pickup coil of a generating unit need not of necessity be mounted for rectilinear movement and can be mounted in accordance with the structure of the present invention to move in a very slight arc. This not only reduces the complexity of the coil mounting, providing for ease of assembly, but allows very accurate alignment of the coil within the air gap which can consequently be held to a minimum without problems of rubbing and the like.

In connection with the seismic mounting of the signal generating units, the pickup leads can be brought into direct contact with the mounting structure and bolted direltly thereto for interconnection with the coil without any danger of shorting in view of the good dielectric properties of the plastic material.

The present invention establishes a relatively low cost seismic mounting apparatus having a long life and providing a very accurate and reliable signal in accordance with vibrations and the like.

The present invention, in addition to providing all of the above advantages, results in a very pleasing and neat appearance as well as a convenient means for providing any desired shaping of the assemblies for purposes of convenience of manufacture and assembly. The cast plastic component may however be machined subsequently if necessary for mounting or associating of additional elements therewith.

The drawings furnished herewith illustrate the best mode presently contemplated for carrying out the invention.

In the drawings:

FIG. 3 is an enlarged view of the work supporting structure shown in FIGS. 1 and 2 with parts broken away to show the details of construction;

FIG. 4 is a vertical section taken on line 4—4 of FIG. 3;

FIG. 5 is an enlarged view of the signal generating unit shown in FIGS. 1 and 2 with parts broken away and sectioned to show details of construction;

FIG. 6 is an end elevational view taken on line 6—6 of FIG. 5;

FIG. 7 is a vertical section taken on line 7—7 of FIG. 5; and

FIG. 8 is an enlarged view of a signal generating coil shown in FIGS. 5–7.

Figure 1:
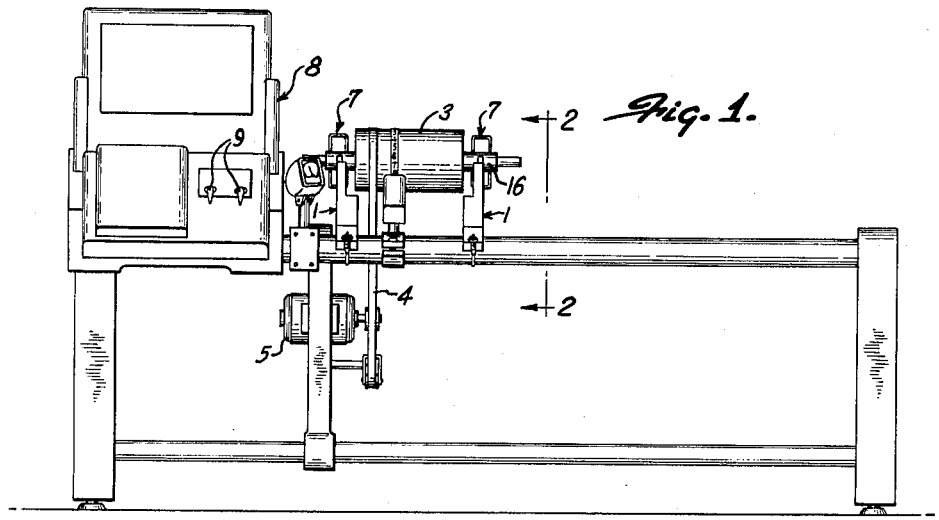
FIG. 1 is a front elevational view of a balancing machine including the seismically mounted generating unit and work support for balancing rotating members.
Figure 2:
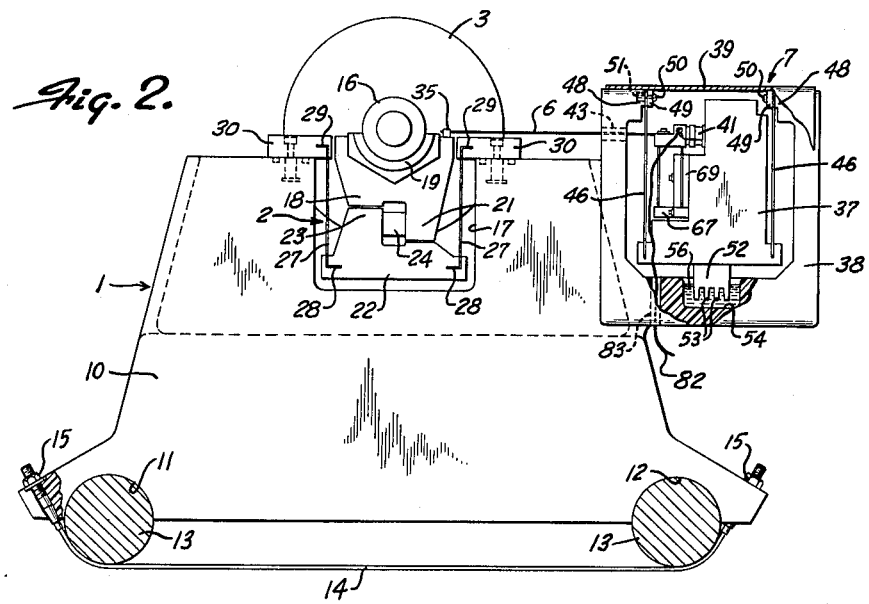
FIG. 2 is a fragmentary end view of FIG. 1 more clearly showing the work support and signal generating unit constructed in accordance with the present invention.

Referring to the drawings and particularly to FIGS. 1 and 2, a balancing machine is shown including laterally spaced end bearing units 1 including work supports 2 for seismically and rotatably supporting a rotor 3 for rotation about a horizontal axis. A light flexible belt 4 encircles the rotor 3, extends downwardly therefrom and is coupled to a suitable drive motor 5 which is mounted within the balancing machine beneath the rotor 3. The motor 5 is preferably and conventionally a constant speed motor such as a standard squirrel cage induction motor. Unbalance in the rotor 3 causes it to rotate with the opposite ends of the member moving in an orbital path and with the axis oscillating between two limit or envelope lines within any given plane perpendicular to the axis of the non-rotating rotor. As a result, vibration is established at the bearings of the rotor 3 which is directly proportional to and varies in synchronism with the rotational movement of the unbalance mass. The unbalance is corrected by redistribution of mass in the rotor 3 to establish rotation about the center axis and to thereby eliminate vibrations at the support bearings in the assembly. Unbalance correction is normally made in a pair of arbitrarily selected axially spaced correction planes, not shown, in a well-known manner such as more fully described in the prior art; for example, U.S. Patent 2,331,733 to W. I. Senger which issued on October 12, 1943.

In the balancing machine, the vibration of the rotor 3 results in a corresponding vibration of the work supports 2 which are connected by axially rigid rods or wires 6 to signal generating units 7. The latter are mounted as a part of the balancing machine immediately behind the spaced work supports 2 in the illustrated embodiment of the invention.

The generating units 7 generate voltages directly proportional to the amplitude of the vibration of the work support 2 and in synchronism or phase with the vibrational movement in the horizontal plane. The voltage signal is an unbalance related signal and is carried to a control and recordng unit 8 having the necessary control elements or knobs 9 for operation of a calibrating and plane separating network forming a part of the total indicating and recording network system, not shown. The particular network system employed forms no part of the present invention, is well known and therefore no further description is given.

The present invention is particularly directed to the construction of the work supports 2 and the signal generating units 7 and a preferred construction thereof is more clearly shown in FIGS. 3–8, inclusive.

Referring particularly to FIGS. 2 and 3, the work support 2 is mounted in a supporting standard or carriage 10 having front and back half bearings 11 and 12 releasably fixed to correspondingly spaced supporting shafts 13 in the balancing machine. A clamp rope or wire 14 passes beneath the shafts 13 and passes upwardly through openings in the carriage 10 and is secured thereto by suitable hex nuts 15 which thread onto the corresponding ends of the rope 14. The carriage 10 is locked to the shaft 13 in spaced relation to properly support the opposite ends of a shaft 16 of the rotor 3.

The rotor 3 is illustrated as a conventional dynamoelectric cylindrical rotor having a cylindrical winding portion with the shaft 16 projecting axially from opposite ends thereof. The opposite ends of shaft 16 rest in the work supports 2 and transmit unbalance vibration within the rotor 3 to the work supports 2 and thus to the associated signal generating units 7.

The illustrated work support 2 of the present invention is generally a rectangular assembly which is mounted within a corresponding recess 17 in the upper end of the carriage 10.

The work support 2 includes an upper cast plastic bearing support or holder 18 having a half bearing 19 bolted or otherwise secured within a suitable top wall recess for accommodating and rotatably supporting the corresponding end of shaft 16 of the rotor 3. Bearing 19 is slightly less than a half bearing and aligns the center of shaft 16 with the pickup wire 6.

The holder 18 is cast of a thermosetting resin such as an epoxy resin. The thermosetting resin should be strengthened by the addition of a finely divided metal filler such as an aluminum dust filler. Aluminum fillers of about 65% by weight of the holder have been found to provide satisfactory strength requirements while readily permitting pouring and cold casting of the mixture of resin, hardener and filler. The percentage of filler may be varied in accordance with the characteristic of the plastic or resin and the final strength requirements. The resin employed should have the characteristics of relatively high strength and essentially no shrinkage or change of dimensions with age and temperature and the suitable resins, fillers and percentages will be readily determined by those skilled in the pertinent art in view of the teaching herein. If the strength and shrinkage characteristic of the plastic are suitable the filler may be eliminated although generally the filler should comprise about 50 to 75% by weight of the holder for balance equipment work holders for supporting rotors and the like.

The epoxy resin or glycedyl polyether may be prepared by condensing a polyhydric phenol with a polyepoxide or polyfunctional halohydrin such as the condensation of bisphenol A with epichlorohydrin. The condensation may be carried on as disclosed, for example, in Patent 2,801,227 entitled, "Process for Manufacture of Glycedyl Ethers of Polyhydric Phenols."

The curing agents used to cure the epoxy resin to its infusible rigid state may take the form of 4.4' methylene dianiline, ethylene diamine, metaphenylene diamine, triethylene triamine, diamino diphenyl sulfone, acid anhydrides such as phthalic, dodecenyl, succinic and chlorendic anhydrides and the like.

In addition, other conventional thermosetting resins, such as polyester, furane, melamine, urea and the like, can also be used.

A filler bar 20 is preferably cast within the holder 18 to reduce the quantity of plastic required and to increase the strength of the unit. A filler bar 20 can be formed by any inexpensive process and does not have to be machined or otherwise precisely formed.

The holder 18 includes a depending leg 21 disposed within a correspondingly formed recess or step of a mounting member 22 forming a part of the work support 2.

The mounting member 22 is a similar cast plastic member and has an upstanding leg 23 mounted adjacent and spaced from the depending leg 21 of the holder 18.

A flat, self-aligning leaf spring 24 spans the space between the legs 21 and 23 and includes oppositely offset legs 25 which include locking openings 26 and are embedded within the legs 21 and 23 of the holder 18 and mounting member 22, respectively. The spring 24 constitutes the sole means interconnecting the holder 18 and the mounting member 22. The center of the free-length of self-aligning spring 24 is directly below the centerline of the workpiece and therefore on the vertical centerline of the bearing 19. As the journal of shaft 16 twists, the bearing 19 is allowed to follow the motion.

The mounting member 22 is supported by a pair of flat leaf springs 27 which are cast embedded in projections on the ends of the mounting member 22 on opposite sides of the self-aligning spring 24. The leaf springs 27 project vertically upwardly in planes parallel to a vertical plane through the rotational axis of the rotor 3. The lower ends of the flat leaf springs 27 are bent inwardly and apertured as at 28 and are integrally cast and embedded within the projections of mounting member 22. The bent and apertured portions 28 of springs 27 serve to securely and rigidly interlock the spring to the mounting member 22. The upper ends of the springs 27 are bent outwardly in opposite directions as at 29 and are integrally cast and embedded within plastic mounting blocks 30 which project outwardly of the work support 2 immediately adjacent the upper portion thereof.

The mounting blocks 30 rest on the top wall portion of the carriage 10 immediately adjacent the work support recess 17 and support the work support 2 within the recess. The mounting blocks 30 are securely locked in place by small cap screws 31 which project downwardly through the mounting blocks 30 and thread into suitable threaded sockets 32 which are embedded within the upper end wall of carriage 10. A pair of locating pins 33 is provided on the under surface of each mounting block 30 and fit in cooperating openings 34 in the top of carriage 10 for precise alignment and positioning of the mounting blocks and the attached supporting leaf springs 27.

The illustrated work support 2 including the leaf springs 27 and the self-aligning spring 24 closely approximates a pendulum system with the weight of the support and the workpiece constituting the pendulum mass. The supporting springs 27 establish the pendulum length and provide a seismically mounted work support.

In accordance with well-known theory, the amplitude of the vibration of the bearing holder 18 corresponds to the actual displacement of the principal inertia axis from the bearing axis and thus provides a rotational frequency of the unbalanced mass in the rotor 3.

The plastic cast structure of the work support 2 including the direct embedding and casting of the mounting and supporting springs 24 and 27 in position provides an extremely inexpensive unit while providing highly accurate location of the work support 2. The resulting modular construction is of a sufficiently low cost to permit complete replacement, rapidly and inexpensively, when a work support 2 is defective for any reason.

The vibrations are essentially restricted to movement in a horizontal plane by the mounting arrangement of supports 2 and this movement is transmitted to the signal generating unit 7 in the following manner.

The one end of pickup rod or wire 6 is soldered or otherwise secured to a small metal pin 35 as at 36. Pin 35 is cast in the upper end of the bearing holder 18 to establish similar movement of wires 16 and holder 18. The opposite end of wire 6 is attached within the signal generating unit 7, as more fully described hereinafter.

The pickup wire 6 is normally a piece of music wire or the like which will transfer motion along its axis but which bends and consequently ignores motion in other directions. The axis of the pickup wire 6 is in a horizontal plane extending perpendicular to the workpiece axis and thus transmits the horizontal vibrations of the bearing holder 18.

Referring particularly to FIGS. 2 and 5–8, the illustrated signal generating unit 7 is an electromagnetic unit generally including a permanent magnet support 37 seismically mounted within a U-shaped mounting bracket 38 on the back upper edge or wall of the carriage 10. A removable cover 39 closes the open top and sides of the bracket 38 to substantially enclose the operating components of unit 7.

A double horseshoe magnet 40 is carried by the magnet support 37 and establishes a stationary magnetic field. A coil carrier 41 is seismically mounted to the support 37 and supports a pickup coil 42 for relative movement within the magnetic field established by the horseshoe magnet 40. The pickup wire 6 is attached to the coil carrier 41 and causes the coil 42 to move back and forth in the field of the magnet 40 as the rotor 3 vibrates due to unbalance. The movement of the coil 42 within the magnetic field generates an electrical signal which is directly proportional to the amplitude of the vibration or oscillation of the coil 42 and therefore is directly proportional to the magnitude of the unbalance. The generated signal is fed to the control network in control box 8 where, through the proper manipulation of control knobs 9, the location and amount of unbalance is automatically determined.

The U-shaped mounting bracket 38 for the generating unit 7 projects upwardly of the carriage 10 and has an opening 43 through which pickup wire 6 freely extends for connection to the carrier 41 of signal generator unit 7.

The permanent magnet support 37 is a cast plastic rectangular block-like member with the principal plane in the principal plane of the work support 2. Mounting projections or flanges 44 and 45 extend outwardly on the opposite sides of the lower end of the support 37. Flat leaf springs 46 have their lower ends embedded one each in the flanges 44 and 45 and are apertured as at 47 to rigidly fix the springs to the support 37. Springs 46 project vertically upwardly in spaced relation to the adjacent portions of the support 37 with the principal plane thereof parallel to a vertical plane through the center of rotor 3. The upper ends of the springs 46 are secured to inward projections 48 on the upper ends of the mounting bracket 38 by individual clamp blocks 49 and clamping screws 50 which extend through aligned openings in the block 49 and the respective springs 46 and thread into suitable sockets 51 which are embedded in the bracket 38 and seismically support the magnet support 37.

A depending paddle 52 is integrally cast to the bottom of the magnet support 37 and includes a plurality of lower fingers 53 which project into a cup 54 integrally formed in the base of the support 37. Cup 54 is filled with oil 55 or other suitable damping liquid.

The magnet support 37 is cast with a series of steps or offset portions in the side facing the work support 2. The double horseshoe magnet 40 is embedded within the uppermost portion of the support 37 and includes an E-shaped magnetic frame 56 opening towards the coil 42 with the coil 42 aligned therewith for movement within the magnetic field established by the magnet 41. The frame 56 includes a central leg 57 over which the coil 42 is telescoped. A permanent magnet 58 is secured about the innermost end of the leg 57 and establishes a magnetic field passing through the frame 56. A magnetic frame plate 59 spans the outer open end of the E-shaped magnetic frame 56 to complete a pair of magnetic paths to opposite sides of the leg 57. The plate 59 includes an opening 60 aligned with and somewhat larger than the central leg 57. The support 37 is formed with an opening 61 corresponding to and including opening 60 to establish an annular groove 62 within which the magnetic coil 42 is mounted for substantially axial movement.

The E-shaped magnetic frame 56 is provided with a rearwardly extending anchor pin 63 which passes through a locating opening in a metal filler block 64 in the support 37.

The filler block 64 is a stepped metal member formed of relatively light metal such as aluminum and about which the plastic is cast to form support 37. The block 64 is formed of three separate rectangular members of different lengths and stacked one on top of the other to give the desired stepped construction to the block 64 and the support 37. The separate members of block 64 may be formed from bar stock cut to suitable lengths and interconnected by tack welds 65 or the like. Suitable locking openings 66 are provided in the block 64 which are filled during the casting of the plastic to form support 37 and securely lock the filler block 64 therein.

The coil carrier 41 for the coil 42 is secured to a mounting plate 67 by a pair of flat leaf springs 68. The mounting plate 67 is a cast plastic member having a vertically upstanding arm 69 disposed in engagement with a vertical locating wall formed by a stepped portion of magnet support 37. Locating buttons 70 and 71 are provided respectively on the upper end of arm 69 and the lower junction of arm 69 to the mounting plate 67 proper and cooperates with corresponding openings in the locating wall of the support 37 for precise location of the plate 67 with respect to the double horseshoe magnet 40 and in particular with respect to the central leg 57 thereof. A pair of cap screws 72 and 73 pass through corresponding openings in the central portion of arm 69 and an ear 74 which is formed on the opposite edge of the plate 67 and thread into suitable tapped openings in the filler block 64 to lock the plate 67 to the support 37.

The leaf springs 68 are generally rectangular members having the lower ends cast and embedded within the upper surface of the plastic mounting plate 67 and projecting vertically upwardly therefrom. Suitable locking openings 75 are formed in the lower ends of the springs 68 for securely interlocking thereof within the mounting plate 67. The upper ends of the springs 68 are similarly cast and embedded in the coil carrier 41 which is a cast plastic member.

The free length of springs 68 accurately locates the coil carrier 41 to axially align the coil 42 for telescoping movement with the central leg 57. Coil carrier 41 is also aligned with the pickup wire 6 which projects inwardly through the opening 43 in the mounting bracket 38.

A small groove is provided in a horizontal surface of the carrier 41 in alignment with pickup wire 6 to receive the end thereof. A clamp plate 76 overlies the pickup wire 6 and the groove and is releasably secured in place by a nut and bolt assembly 77. The carrier 41 is thus fixedly secured to wire 6 and moves therewith in response to the movement of holder 18 of the work support 2. The movement of the bearing holder 18 as previously described is that created by the unbalance in the rotor 3 and consequently the carrier 41 and the attached coil 42 are moved in accordance with the unbalance of the rotor 3.

Carrier 41 includes an integral cylindrical coil carrying portion which is precisely aligned with the central leg 57 of the horseshoe magnet 56. Coil 42 is wound on a coil form 78 which has one end secured to the carrier 41 and which end projects outwardly therefrom into the annular groove 62 in telescoped relation to the central leg 57 of the magnet 40 and properly locates the coil 42 within the magnetic field thereof.

Tinsel leads 79 extend rearwardly from the coil 42 and are secured to a U-shaped support portion 80 of carrier 41 by similar nut and bolt units 81. A pair of output leads 82 is secured one each to the opposite sides of the arms of the U-shaped portion 80 by the nut and bolt units 81 and thus in electrical connection to leads 79. The plastic carrier 41 has good dielectric properties and the leads can be connected therefore without serious danger of shorting. The leads 82 extend downwardly between the springs 68 and past the lower end of magnet support 37 and then outwardly through an opening 83 in the bottom of mounting bracket 38 to the control and recording unit 8. The unbalance related signals generated in coil 42 are thus transmitted to the network system, not shown, for determining of the amount and the location of unbalance in the selected planes, not shown.

The cast plastic structure of the signal generating unit 7 including the direct embedding of the seismic mounting springs, the magnetic field structure and supporting elements provides an extremely inexpensive unit having the several elements accurately located for optimum operation without the necessity of expensive machining and assembling of parts. The accuracy of component location is such that coil 42 can be mounted as shown in the preferred embodiment of the invention to move in a very slight arc and the necessary close coupling of the coil to the central leg 57 maintained. The assembly and alignment of the components in the generating unit 7 and to the balancing machine is simple and fast and can be done by a relatively inexperienced workman.

The plastic components of the generating unit are similarly cold cast with the spring members and the like directly embedded therein. The plastic components should preferably contain as great a percentage of filler consistent with convenient and commercially practical pouring for casting. Thus, the density of the component increases with the filler and thus reduces the compressibility thereof to maintain the proper mounting and location of the spring members and the like. Optimum results have been obtained employing an aluminum filler of 65% by weight of the plastic component although the percentage may vary between 50 and 75% by weight. Further, the dielectric characteristic of the plastic components of the generating units affect the generating and transmission of proper signals. Thus, the filler particles should preferably be separated. However as the percentage of filler increases the random contact increases. Where an aluminum filler is employed, preferred construction employs a filler mixture of approximately 60% by weight of substantially pure aluminum dust and 40% by weight of a finely divided aluminum oxide. Any desired ratio can be employed based on the desired output accuracy and cost considerations.

Although the described movement of the generating coil is generally satisfactory, as rectilinear movement can be provided within the scope of the present invention by suitable design of the supporting spring. For example, the leaf springs might be made with a generally U-shaped configuration with the coil secured to one leg and the opposite leg secured to the magnet support or the like. In such a construction, the web or base portion will move in an arc and establish rectilinear motion of the coil within the magnetic field.

The present invention thus provides a highly economical seismically mounted apparatus and process of forming thereof which can rapidly produce the components and units without sacrifice of quality and reliability.

Various modes of carrying out the invention are contemplated as being within the scope of the following claims particularly pointing out and distinctly claiming the subject matter which is regarded as the invention.

I claim:

1. In a balancing machine for balancing rotating equipment having shaft means,
   (a) a carriage member of an epoxy resin,
   (b) a bearing member of an epoxy resin having a bearing to rotatably support the shaft means and having a depending leg, (c) a support member of an epoxy resin extending transversely of the depending leg and in the plane of the depending leg and having an integral coplanar upstanding portion laterally spaced from the depending leg, (d) a flat spring extending between the depending leg and the upstanding portion and having its opposite ends embedded into the respective members and constituting the single interconnection therebetween, (e) a pair of mounting members of an epoxy resin disposed on opposite sides of the bearing member and releasably attached to said carriage member, (f) leaf-type springs extending between the mounting members and the support member and having the opposite ends of each embedded in the adjacent members and constituting the sole interconnection therebetween, (g) a mounting bracket secured to the carriage member in alignment with said bearing member, (h) a support of an epoxy resin secured to the bracket and having a magnetic member embedded therein and having a cylindrical pole piece within an opening in the support aligned therewith and defining an annular groove facing said bearing member, (i) a coil adapted to fit with said groove in closely spaced telescoped relation to the cylindrical pole piece, (j) a carrier of an epoxy resin having a pole piece projecting therefrom and supporting said coil, (k) a mounting member of an epoxy resin for the carrier secured to the support, and (l) seismic spring members extending between the last named mounting member and the carrier with the opposite ends of each embedded into the adjacent members and constituting the sole interconnection therebetween.

2. In a bearing support for rotatably supporting a rotating shaft means, (a) a thermosetting plastic bearing member with a bearing means to rotatably support the shaft means and having a depending leg, (b) a thermosetting plastic support member extending transversely of the depending leg and in the plane of the depending leg and having an integral coplanar upstanding leg laterally spaced from the depending leg, (c) a flat self-aligning spring extending between the depending leg and the upstanding portion and having its opposite ends embedded in the respective members and sonstituting the single interconnection therebetween, (d) a pair of thermosetting plastic mounting members disposed on opposite sides of the bearing member, and (e) flat leaf springs extending between the thermosetting plastic mounting members and the thermosetting plastic support member and having the opposite ends of each embedded into the adjacent members and constituting the sole interconnection therebetween.

3. In a bearing support unit for rotating equipment having shaft means, (a) a thermosetting plastic bearing member rotatably supporting the shaft means and having an offset leg, (b) a thermosetting plastic support member disposed in the plane of the bearing member and having an offset leg, and (c) a flat spring extending between the offset legs and having its opposite ends embedded in the respective members and constituting the single interconnection therebetween.

4. In a support assembly for rotating equipment having shaft means for detecting shaft vibration by pickup means coupled to the shaft support assembly, (a) a bearing unit having a bearing and thermosetting plastic mounting members disposed on opposite sides of the bearing, and (b) leaf-type springs having the ends integrally embedded one each in the respective plastic mounting members and constituting the sole supporting interconnection thereto to seismically mount the bearing unit whereby the pickup means is actuated solely by shaft generated vibration.

5. In a seismically mounted pickup coil assembly, (a) a thermosetting plastic support having a magnetic member embedded therein, said magnetic member having a cylindrical pole piece aligned with an opening in the support and defining an annular groove therebetween, (b) a coil adapted to fit within said groove in closely spaced telescoped relation to the cylindrical pole piece, (c) a thermosetting plastic carrier having a pole piece projecting therefrom and supporting said coil within said groove, (d) a thermosetting plastic mounting bracket for the carrier secured to the plastic support, and (e) seismic spring members extending between the plastic mounting bracket and the plastic carrier with the opposite ends of each embedded into the adjacent members and constituting the sole interconnection therebetween.

6. In an elecromagnetic signal generator including a hollow tubular coil mounted for telescopic movement with a generally correspondingly configured magnetic arm, (a) support means to fixedly support the magnetic arm relative to the coil and having a locating wall, (b) a coil supporting assembly including a thermosetting plastic mounting member and a thermosetting plastic coil carrier member held in predetermined spaced relation by seismic mounting springs embedded in the respective members, and (c) means to fixedly secure the mounting member to the locating wall to properly mount the coil with respect to the magnetic arm for movement of the coil on said springs.

7. The generator of claim 6 wherein said support means includes, (a) a thermosetting plastic block, (b) a pair of thermosetting plastic mounting members for connection to the support means, and (c) seismic mounting springs embedded in the plastic block and the plastic mounting members for seismically mounting of the plastic block.

8. In a seismically mounted pickup coil assembly, (a) a stepped support of a thermosetting resin defining an intermediate locating wall and having a magnetic field member embedded within the upper portion thereof, said magnetic field member having a cylindrical pole piece aligned with an opening in a wall above the intermediate wall in the support with an annular groove between the wall of the opening and the pole piece, (b) a coil adapted to fit within said groove in closely spaced telescoped relation to the cylindrical pole piece, (c) a carrier of a thermosetting resin having a pole piece projecting therefrom and supporting said coil within said groove and having vibration attachment input means, (d) a mounting bracket of a thermosetting resin for the carrier secured to the intermediate locating wall of the support, and (e) seismic leaf spring members extending between the mounting bracket and the carrier with the opposite ends of each embedded respectively into the adjacent carrier and the mounting bracket and constituting the sole interconnection therebetween and properly positioning said coil in the annular groove.

9. The seismically mounted pickup coil assembly of claim 8 having,
(a) a stepped filler block embedded within said support, and
(b) means within said support securing said magnetic member to said filler block.

10. The seismically mounted pickup coil assembly of claim 8 wherein said magnetic field member comprises,
(a) a generally E-shaped frame having said pole piece as the central leg thereof,
(b) a magnetic frame plate spanning the open end of the E-shaped frame and having an opening aligned and forming a portion of the opening in the support, and
(c) a permanent magnet encircling an inner portion of said pole piece inwardly of said annular groove.

11. The seismically mounted pickup coil assembly of claim 8 wherein said leaf spring members comprise,
(a) a pair of flat rectangular leaf springs arranged in spaced and superposed relation with the main plane of the leaf spring being parallel and normal to the axis of said coil.

12. In a seismically mounted pickup coil assembly,
(a) a stepped support formed of an epoxy plastic and having an intermediate locating wall and a magnetic field wall offset therefrom,
(b) a pair of parallel leaf springs having corresponding ends embedded one each in the opposite sides of the stepped support with the principal plane of the leaf springs parallel to said intermediate wall,
(c) a magnetic field unit embedded in the support and having a cylindrical pole piece aligned within an opening in the magnetic field wall and defining an annular groove arranged perpendicularly to said locating wall,
(d) a tubular coil telescopically mounted within said groove in closely spaced telescoped relation to the cylindrical pole piece,
(e) a carrier formed of an epoxy plastic and disposed between the locating wall and the adjacent spring and having an integral cylindrical projecting support member correspondingly to the diameter of the pole piece and suporting said coil within said grove,
(f) a mounting bracket for the carrier secured to the locating wall of the stepped support formed of an epoxy plastic and having a locating surface abutting said locating wall, and
(g) flat rectangular seismic springs extending between the plastic mounting bracket and the plastic carrier with the opposite ends of each embedded respectively into the adjacent carrier and the mounting bracket and constituting the sole interconnection therebetween, said leaf springs being arranged in spaced and superposed relation with the main plane of the leaf springs being parallel to said locating wall.

13. The seismically mounted pickup coil assembly of claim 12 wherein,
(a) said epoxy plastic contains a finely divided metal filler.

14. A seismic mounting for a device, comprising,
(a) a thermosetting plastic support having means for carrying the device,
(b) a thermosetting plastic attachment member, and
(c) seismic mounting spring means having spaced portions embedded in the plastic support and the plastic member to seismically mount the device on the attachment, said support and attachment member being cast about the spring means to form the sole interconnection therebetween.

References Cited by the Examiner

UNITED STATES PATENTS

| | | | |
|---|---|---|---|
| 2,439,219 | 4/1948 | O'Connor | 267—1 X |
| 2,724,971 | 11/1955 | Kroft | 73—462 |
| 2,739,806 | 3/1956 | Stelzer | 267—1 X |
| 2,743,507 | 5/1956 | Kornei | 29—155.5 |
| 2,857,764 | 10/1958 | Frank | 73—462 |
| 3,019,622 | 2/1962 | Fermier | 267—1 X |
| 3,045,326 | 7/1962 | Griffiths | 29—155.5 |
| 3,067,404 | 12/1962 | Hilderbrandt | 73—71 X |
| 3,082,508 | 3/1963 | Velde | 29—155.5 |

RICHARD C. QUEISSER, *Primary Examiner.*

JOSEPH P. STRIZAK, *Examiner.*

JAMES J. GILL, *Asisstant Examiner.*